(12) United States Patent
Park et al.

(10) Patent No.: US 6,839,097 B2
(45) Date of Patent: Jan. 4, 2005

(54) LIQUID CRYSTAL DISPLAY WITH ELECTROSTATIC PROTECTION CIRCUITS

(75) Inventors: Jeong Ki Park, Kumi-shi (KR); Jae Seok Park, Taegu-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 359 days.

(21) Appl. No.: 09/828,839

(22) Filed: Apr. 10, 2001

(65) Prior Publication Data

US 2001/0030716 A1 Oct. 18, 2001

(30) Foreign Application Priority Data

Apr. 12, 2000 (KR) .................................... P 2000-19354

(51) Int. Cl.⁷ .......................................... G02F 1/1333
(52) U.S. Cl. ........................................................ 349/40
(58) Field of Search ............................................ 349/40

(56) References Cited

U.S. PATENT DOCUMENTS

| | | | | |
|---|---|---|---|---|
| 5,371,351 A | * | 12/1994 | Van Berkel | ............... 250/208.1 |
| 5,497,146 A | * | 3/1996 | Hebiguchi | ............... 340/14.63 |
| 5,657,139 A | | 8/1997 | Hayashi | |
| 5,744,837 A | | 4/1998 | Kamiura et al. | |
| 5,936,687 A | | 8/1999 | Lee | |
| 5,953,086 A | | 9/1999 | Oogiichi et al. | |
| 5,973,658 A | | 10/1999 | Kim et al. | |
| 6,043,971 A | | 3/2000 | Song et al. | |
| 6,072,550 A | * | 6/2000 | Kim | ............................. 349/40 |
| 6,175,394 B1 | * | 1/2001 | Wu et al. | ...................... 349/40 |
| 6,304,305 B1 | | 10/2001 | Matsumoto et al. | |
| 6,340,963 B1 | * | 1/2002 | Anno et al. | ................... 345/92 |

FOREIGN PATENT DOCUMENTS

| | | |
|---|---|---|
| DE | 196 13 477 A1 | 10/1997 |
| JP | 9090428 | 4/1997 |
| JP | 9297321 | 11/1997 |
| JP | 11-119256 A | 4/1999 |

* cited by examiner

Primary Examiner—Robert H. Kim
Assistant Examiner—P. R. Akkapeddi
(74) Attorney, Agent, or Firm—McKenna Long & Aldridge LLP

(57) ABSTRACT

An LCD having electrostatic protecting circuits arranged to enable closely spaced signal lines and electrostatic protection in high resolution LCDs. A common electrode crosses a plurality of signal lines that extend from a driving circuit to an LCD array. A plurality of electrostatic protecting circuits are arranged on each side of the common electrode between adjacent signal lines. The signal lines can be beveled or curved to provide space of the electrostatic protecting circuits. Furthermore, multiple common electrodes can be incorporated, enabling electrostatic protecting circuits to be connected between the signal lines and the various common electrodes.

5 Claims, 6 Drawing Sheets

LIQUID CRYSTAL DISPLAY WITH ELECTROSTATIC PROTECTION CIRCUITS

CROSS REFERENCE

This application claims the benefit of Korean Patent Application No. 2000 19354, filed Apr. 12, 2000, under 35 U.S.C. §119, the entirety of which is hereby incorporated by reference.

BACKGROUND OF THE INVENTION

1. Field of the Invention

This invention relates to liquid crystal displays (LCD), and more particularly, to an LCD having an electrostatic protection circuit.

2. Discussion of the Related Art

Generally, a liquid crystal display is a complex device that includes a liquid crystal panel, a light source, and driving circuitry.

The liquid crystal panel itself includes upper and lower transparent substrates and an interposed liquid crystal layer. On the upper transparent substrate are a system electrode, a black matrix layer, and a color filter layer. On the lower transparent substrate are a plurality of equally spaced gate lines that are arranged along one direction, and a plurality of equally spaced data lines that are arranged perpendicular to the gate lines. Thus there is a plurality of crossing points where the gate lines and the data lines cross.

Within an LCD panel Is an array of pixel regions defined by the spaces between the crossing gate and data lines. A pixel electrode and a thin film transistor (TFT) are arranged in each pixel region. The TFT gate electrodes connects to the gate lines, the TFT source electrodes connect to the data lines, and the TFT drain electrodes connect to the pixel electrodes. The gate and data lines are electrically connected to the driving circuitry. In operation, the thin film transistors are selectively turned on by gate signals applied to the gate lines. Furthermore, data signals are selectively applied to the data lines. The result is that the various TFTs apply signals to their electrodes so as to produce a desired image.

Often, static electricity is produced during the processing and/or testing of the LCD panels. When this static electricity is applied to the gate or data lines damage or destruction of the LCD panel can occur. One method of protecting arrays from static electricity uses common electrodes inserted between the driving circuit and the LCD array, with the common electrodes extending generally perpendicular to the gate lines and/or to the data lines. Then, electrostatic protecting circuits, such as varistors, diodes, zener diodes, unidirectional or bi-directional transient voltage suppressors, or bi-directional voltage triggered switches, are formed at the crossings of the gate and/or data lines and the common electrodes. By using such electrostatic protecting circuits the potential of the common electrode is applied to the gate and/or data lines by the electrostatic protecting circuit as required to protect the LCD panel. Accordingly, static electricity applied to the gate lines or to the data lines does little or no damage.

A related art LCD having an electrostatic protecting circuit will be described with reference to the schematic view of FIG. 1. In the related art LCD the electrostatic protecting circuits are arranged in parallel. A common electrode 4 extends between a driving circuit 1 and an LCD array 2 and perpendicular to the data or gate lines 3. An electrostatic protecting circuit 5 located near each crossing of the common electrode 4 and the lines 3. Further, as shown, each line 3 extends in a straight line between the driving circuit 1 and the LCD array 2.

While generally successful, the related art LCD shown in FIG. 1 has a problem. Since the electrostatic protecting circuits are located near the crossings of the common electrode 4 and the lines 3, it is very difficult to physically locate the electrostatic protecting circuits 5 if the lines 3 are closely spaced, as can happen in high resolution LCDs, or if the electrostatic protecting circuits are relatively large. Thus, new approaches to incorporating electrostatic protecting circuits would be beneficial.

SUMMARY OF THE INVENTION

Accordingly, the present invention is directed to an LCD that substantially obviates one or more of the problems due to limitations and disadvantages of the related art.

An object of the present invention is to provide an LCD in which the locations of the electrostatic protecting circuits enable closely spaced signal lines.

Another object of the present invention is to provide an LCD in which the signal lines are modified to enable closely spaced signal lines.

Another object of the present invention is to provide a high resolution LCD having electrostatic protecting circuits.

Yet another object of the present invention is to provide an LCD having relatively large electrostatic protecting circuits.

Another object of the present invention is to provide an LCD having relatively small pixels.

Additional features and advantages of the invention will be set forth in the descriptions that follows, and in part will be apparent from those descriptions, or may be learned by practice of the invention. The objectives and other advantages of the invention will be realized and attained by the scheme particularly pointed out in the written description and claims hereof, as well as shown in the appended drawings.

To achieve these and other advantages and in accord with a purpose of the present invention, as embodied and broadly described, an LCD according to the present invention includes a plurality of signal lines, a common electrode that extends generally perpendicular to the signal lines, a plurality of first electrostatic protecting circuits respectively located on one side of the common electrode and between adjacent signal lines, and a plurality of second electrostatic protecting circuits arranged on the other side of the common electrode and between adjacent signal lines, wherein each electrostatic protecting circuit connects between the common electrode an a signal line. Beneficially, and as required, the adjacent signal lines include protrusions, which may be beveled or curved, that enable the electrostatic protecting circuits to be located between the signal lines.

To further achieve these and other advantages and in accordance with the purpose of the present invention, an LCD according to the present invention includes a plurality of signal lines, first and second common electrodes arranged perpendicular to the signal lines and between driving circuitry and an LCD array, and a plurality of electrostatic protecting circuits arranged on opposite sides of the common electrodes and between the signal lines. Each electrostatic protecting circuit connects between a signal line and one of the common electrodes. Beneficially, the signal lines protrude as required to enable the electrostatic protecting circuits to be located between the signal lines. Also beneficially, the position of the electrostatic protecting circuits alternate, with one electrostatic protecting circuit being adjacent a first common electrode and any neighboring electrostatic protecting circuits being adjacent the second common electrode.

To further achieve these and other advantages and in accordance with the purpose of the present invention, an LCD according to the present invention includes sets of pairs of signal lines, first and second common electrodes arranged perpendicular to the signal lines and between driving circuitry and an LCD array, and a plurality of electrostatic protecting circuits. The electrostatic protecting circuits are alternatingly located adjacent the first common electrode and then adjacent the second common electrode. An electrostatic protecting circuit connects between the first common electrode and a first signal line of the pair of signal lines of a set, while a neighboring electrostatic protecting circuit connects between the second common electrode and the other signal line of the set. Beneficially, and as required, the signal lines includes protruding portions that enable the electrostatic protecting circuits to be located between the signal lines of a set.

It is to be understood that both the foregoing general description and the following detailed description are exemplary and explanatory only and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF THE ILLUSTRATED EMBODIMENTS

Reference will now be made in detail to the illustrated embodiments of the present invention, examples of which are shown in the accompanying drawings.

Figure 1:
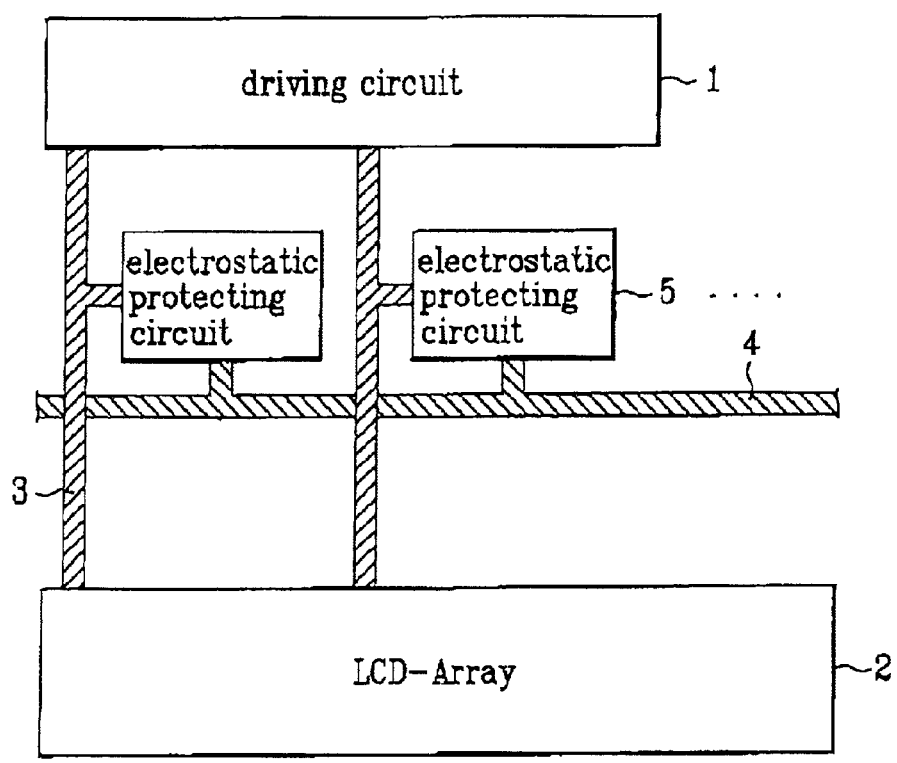
FIG. 1 is a schematic view of a related art LCD having electrostatic protecting circuits.
Figure 2:
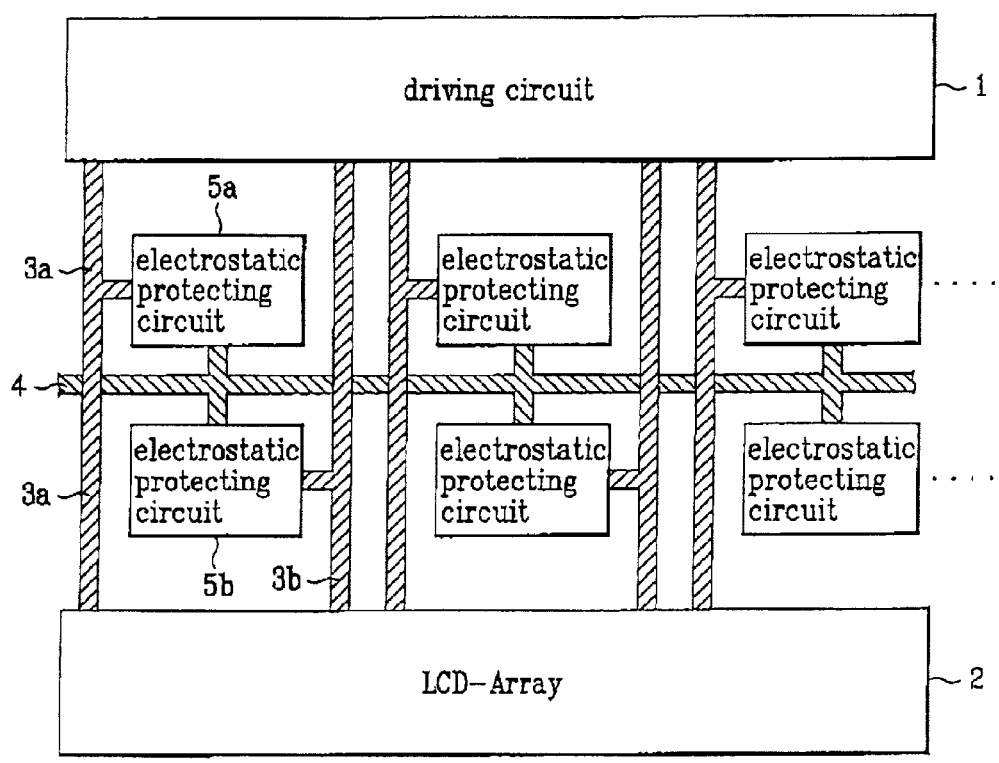
FIG. 2 is a schematic view of an LCD having electrostatic protecting circuits that is in accord with a first embodiment of the present invention.

FIG. 2 is a schematic view of an LCD having electrostatic protecting circuits that is in accord with a first embodiment of the present invention. As shown, a common electrode 4 is formed perpendicular to a plurality of sets of signal lines 3a and 3b, which may be data lines and/or gate lines. The common electrode runs between a driving circuit 1 and an LCD array 2. The signal lines 3a and 3b of a set are adjacent one another. Furthermore, pairs of electrostatic protecting circuits 5a and 5b are arranged such that the common electrode 4 runs between them and such that the electrostatic protecting circuits are adjacent the signal lines 3a and 3b. A first electrostatic protecting circuit 5a connects between an associated first signal line 3a and the common electrode 4, while the second electrostatic protecting circuit 5b connects between an associated second signal line 3b and the common electrode 4. In this embodiment the signal lines 3a and 3b are straight. An LCD constructed according to FIG. 2 enables a reduction in the gap between the signal lines. Beneficially, the signal lines that leave the driving circuit 1 and that enter the LCD array 2 are evenly spaced.

Figure 3:
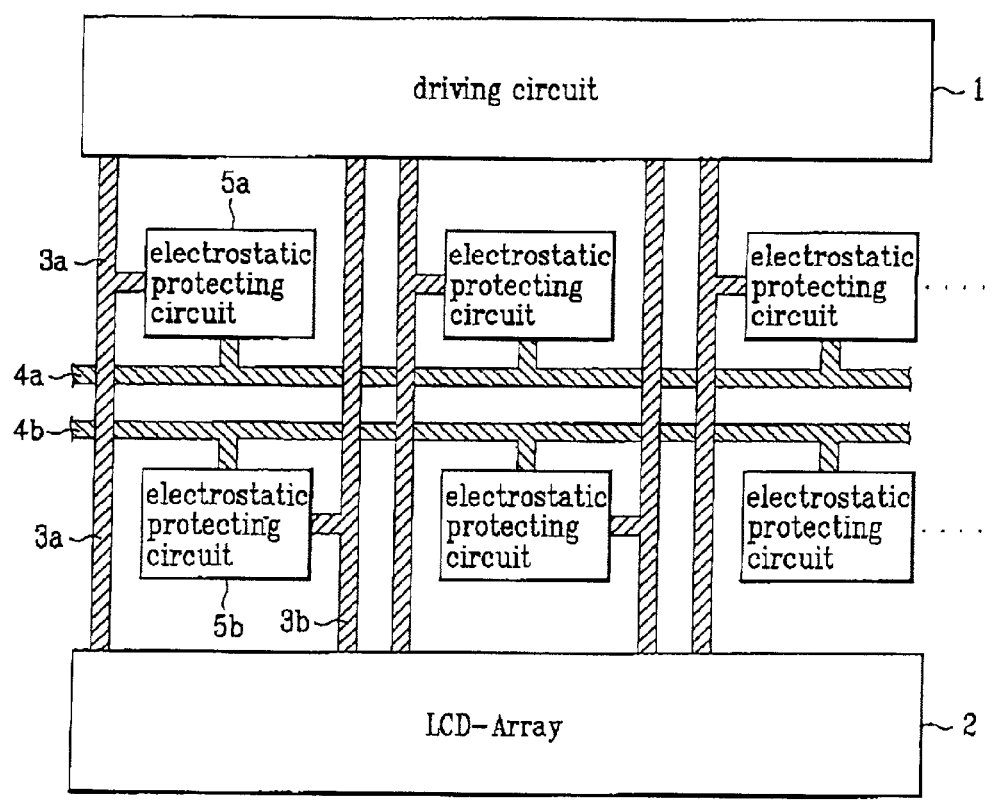
FIG. 3 is a schematic view of an LCD having electrostatic protecting circuits that is in accord with a second embodiment of the present invention.

FIG. 3 is a schematic view of an LCD having electrostatic protecting circuits that is in accord with a second embodiment of the present invention. As shown in FIG. 3, parallel first and second common electrodes 4a and 4b are arranged adjacent one another and generally perpendicular to sets of signal lines 3a and 3b. The first and second common electrodes 4a and 4b are also disposed between a driving circuit 1 and an LCD array 2. A first electrostatic protecting circuit 5a connects between a signal line 3a and the first common electrode 4a, while a second electrostatic protecting circuit 5b connects between a signal line 3b and the second common electrode 4b. As shown, the electrostatic protecting circuits 5a and 5b are alternatingly located adjacent the first and second common electrodes 4a and 4b, respectively. That is, a first electrostatic protecting circuit 5a, which connects between the first signal line 3a and the first common electrode 4a, is on the side of the first common electrode that is opposite the second common electrode. Furthermore, the second electrostatic protecting circuit 5b, which connects between the second signal line 3b and the second common electrode 4b, is on the side of the second common electrode that is opposite the first common electrode. Beneficially, the signal lines that leave the driving circuit 1 and that enter the LCD array 2 are evenly spaced.

Figure 4:
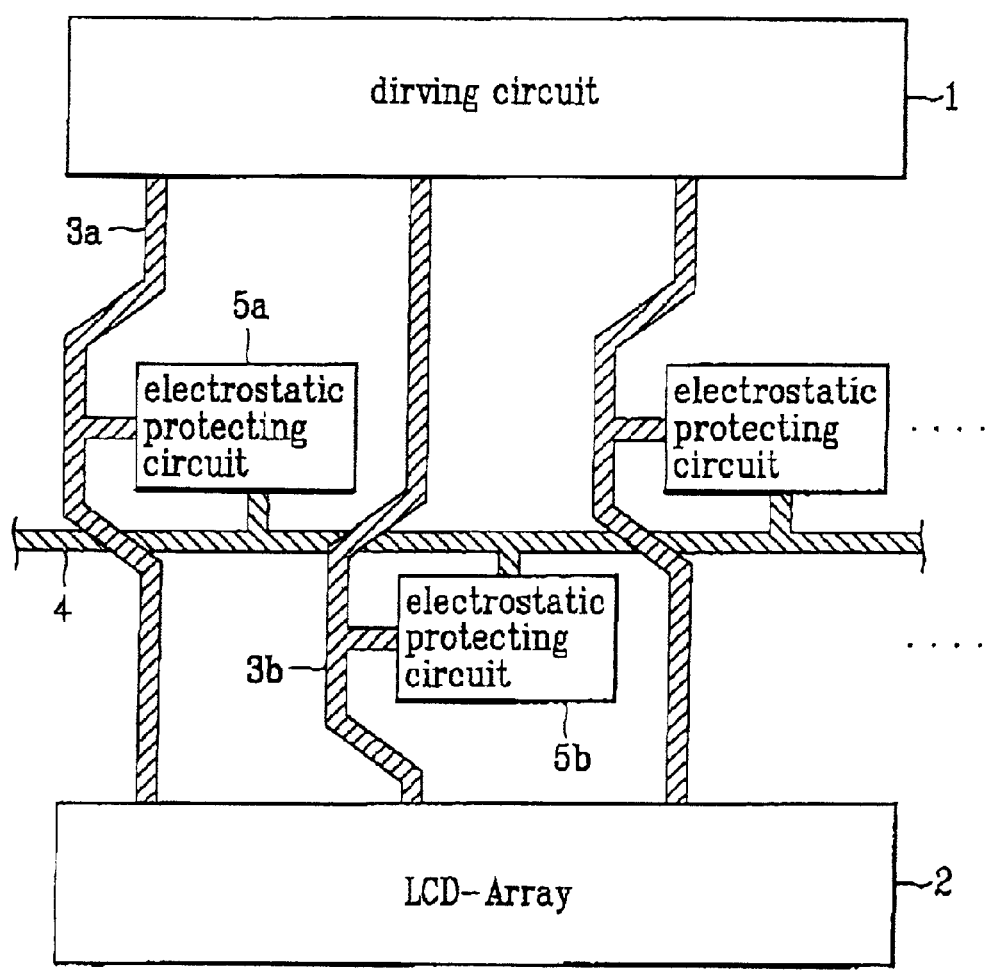
FIG. 4 is a schematic view of an LCD having electrostatic protecting circuits that is in accord with a third embodiment of the present invention.

As shown in FIG. 4, a plurality of first electrostatic protecting circuits 5a are positioned at one side of the common electrode 4, a plurality of second electrostatic protecting circuits 5b are positioned at opposite side of the common electrode, and each of the first electrostatic protecting circuits 5a and each of the second electrostatic protecting circuits 5b are positioned at opposite sides of the signal line 3b. Each of the first electrostatic protecting circuits 5a connects between the signal line 5a and the common line 4, and each of the second electrostatic protecting circuits 5b connects between the signal line 5b and the common line 4.

FIG. 4 is a schematic view of an LCD having electrostatic protecting circuits that is in accord with a third embodiment of the present invention. As shown in FIG. 4, a common electrode 4 is disposed between a driving circuit 1 and an LCD array 2. A plurality of signal lines, designated as 3a and 3b, which could be data lines and/or gate lines, extend between a driving circuit 1 and an LCD array 2. Furthermore, electrostatic protecting circuits 5a and 5b are positioned between the respective signal lines 3a and 3b. The electrostatic protecting circuits 5a connect between the signal lines 3a and the common electrode 4, while the electrostatic protecting circuits 5b connect between the signal lines 3b and the common electrode 4.

Still referring to FIG. 4, the signal lines 3a and 3b include protrusions, which may have beveled or curved portions, for the first and second electrostatic protecting circuits 5a and 5b. The protrusions produce spaces for the electrostatic protecting circuits. Beneficially, the signal lines that leave the driving circuit 1 and that enter the LCD array 2 are evenly spaced.

Figure 5:
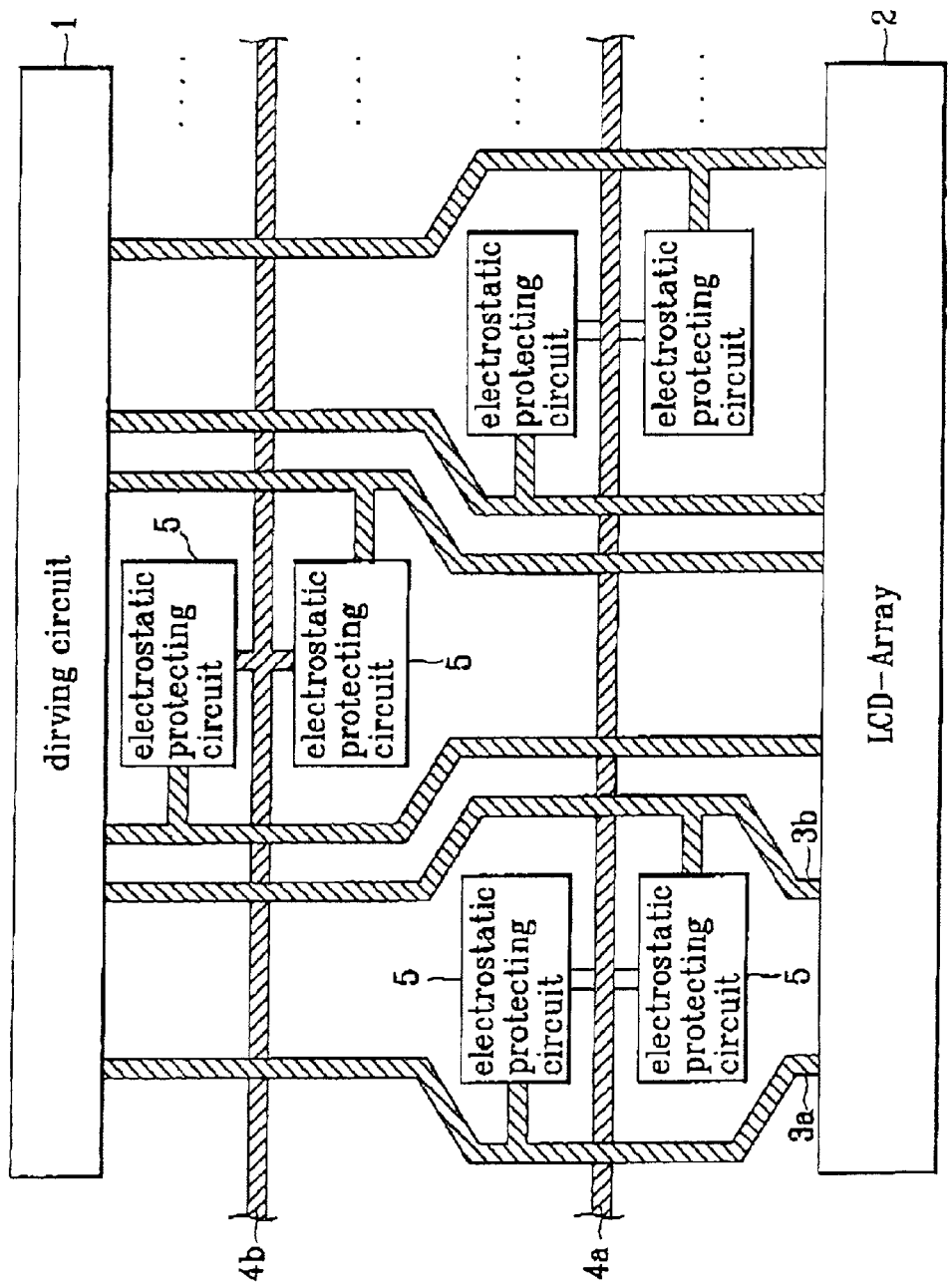
FIG. 5 is a schematic view of an LCD having electrostatic protecting circuits that is in accord with a fourth embodiment of the present invention.

FIG. 5 is a schematic view of an LCD having electrostatic protecting circuits that is in accord with a fourth embodiment of the present invention. As shown in FIG. 5, parallel first and second common electrodes 4a and 4b are arranged between a driving circuit 1 and an LCD array 2. Furthermore, a plurality of sets of adjacent signal lines 3a and 3b, which can be data lines and/or gate lines, extend from the driving circuit 1 to the LCD array 2. Still referring to FIG. 5, electrostatic protecting circuits 5 are alternatingly located on both sides of the first and second common electrodes 4a and 4b and between sets of signal lines 3a and 3b. That is, for a first set of signal lines 3a and 3b, electrostatic protecting circuits are located on each side of the common electrode 4a, while within the neighboring set of signal lines 3a and 3b the electrostatic protecting circuits are arranged on each side of the common electrode 4b, and so on. In both cases, an electrostatic protecting circuit connects between the signal line 3a and the centering common electrode, and another electrostatic protecting circuit connects between the signal line 3b and the centering common electrode. Still referring to FIG. 5, the signals lines 3a and 3b can have protrusions, which may be beveled or curved, to provide spaces between the signals lines 3a and 3b for the electrostatic protecting circuits 5. Furthermore, as shown, the electrostatic protecting circuits connected to the first common electrode 4a are not aligned with the electrostatic protecting circuits connected to the second common electrode 4b. Beneficially, the signal lines that leave the driving circuit 1 and that enter the LCD array 2 are evenly spaced.

Figure 6:
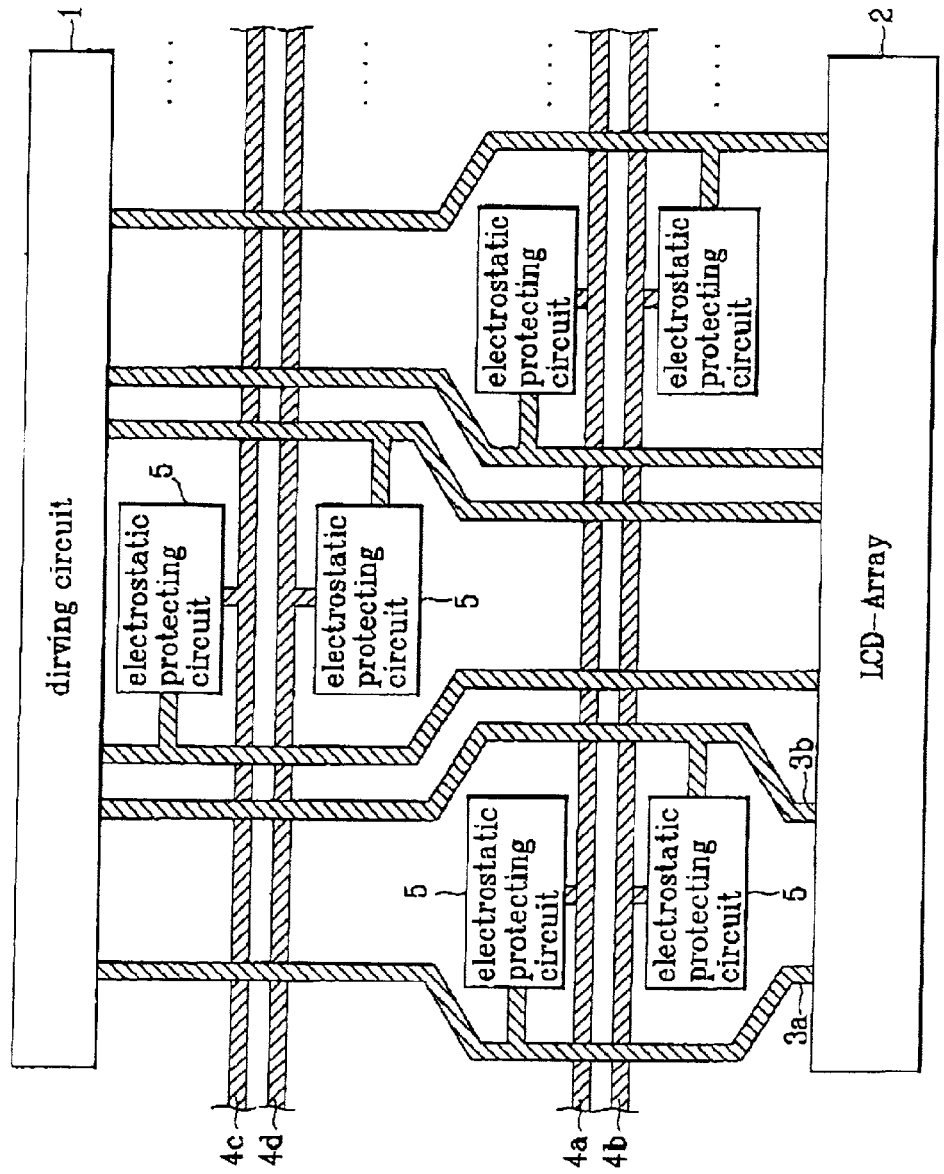
FIG. 6 is a schematic view of an LCD having electrostatic protecting circuits that is in accord with a fifth embodiment of the present invention.

FIG. 6 is a schematic view of an LCD having electrostatic protecting circuits that is in accord with a fifth embodiment of the present invention. As shown in FIG. 6, parallel first, second, third and fourth common electrodes 4a, 4b, 4c and 4d are arranged between a driving circuit 1 and an LCD array 2. Additionally, a plurality of sets of signal lines 3a and 3b, which may be data lines and/or gate lines, extend between the driving circuit 1 and the LCD array 2. As shown, the first common electrode 4a is adjacent to the second common electrode 4b, the third common electrode 4c is adjacent to the fourth common electrode 4d, and the first and second common electrodes are relatively widely spaced from the third and fourth common electrodes.

Between the signal lines 3a and 3b of each set is a pair of electrostatic protecting circuits 5. Those electrostatic protecting circuits are arranged on opposite sides of the adjacent common electrodes. That is and as shown, electrostatic protecting circuits 5 are arranged on opposite sides of the first and second common electrodes 4a and 4b, or on the opposite sides of the third and fourth common electrodes 4c and 4d. Still referring to FIG. 6, the signal lines 3a and 3b of a set may include protrusions, which may be beveled or curved, that form a spaces for the electrostatic protecting circuits. Beneficially, the signal lines that leave the driving circuit 1 and that enter the LCD array 2 are evenly spaced.

An LCD according to the present invention has significant advantages. Since the electrostatic protecting circuits are arranged on both sides of one or more common electrodes, or by protrusions of the signal lines, the electrostatic protecting circuits can be positioned and aligned such that only a narrow space between signal lines is required. This enables electrostatic protection in high resolution LCDs.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An LCD device having a driving circuit and a pixel array, comprising:
    a plurality of pairs of signal lines formed at constant intervals between the driving circuit and the pixel array, each pair of the signal lines including first and second signal lines;
    a common electrode intersecting the signal lines, thereby forming first and second signal-line portions;
    a plurality of first electrostatic protecting circuits located at the first signal-line portion and located between the corresponding first and second signal lines, wherein each of the first electrostatic protecting circuits is electrically connected with the first signal line and the common electrode; and
    a plurality of second electrostatic protecting circuits located at the second signal-line portion and located between the corresponding first and second signal lines, wherein each of the second protecting circuits is electrically connected with the second signal line and the common electrode,
    wherein the first and second electrostatic protecting circuits are substantially aligned with each other on opposite side of the common line.

2. The LCD of claim 1, wherein the common electrode includes two first and second lines, the first line being connected with the first electrostatic protecting circuit and the second line being connected with the second electrostatic protecting circuit.

3. The LCD of claim 2, wherein the first and second electrostatic protecting circuits are arranged at both sides around the first and second lines.

4. An LCD comprising:
    a plurality of signal lines formed at constant intervals;
    a common electrode intersecting the signal lines, thereby forming first and second signal-line portions;
    a plurality of first electrostatic protecting circuits located at the first signal-line portion, the first electrostatic protecting circuits electrically connected with odd numbered signal lines and the common electrode; and
    a plurality of second electrostatic protecting circuits located at the second signal-line portion, the second electrostatic protecting circuits electrically connected with even numbered signal lines and the common electrode,
    wherein the first and second electrostatic protecting circuits are substantially aligned with each other on opposite side of the common line.

5. The LCD of claim 4, wherein each of the signal lines includes protrusions for the first and second electrostatic protecting circuits.

* * * * *